United States Patent

[11] 3,552,398

| [72] | Inventors | Olin L. Looker, Milford; Larry L. Slates, Hoopeston, Ill. |
|---|---|---|
| [21] | Appl. No. | 793,780 |
| [22] | Filed | Jan. 24, 1969 |
| [45] | Patented | Jan. 5, 1971 |
| [73] | Assignee | FMC Corporation San Jose, Calif. a corporation of Delaware |

[54] HARVESTER WITH TORQUE RESPONSIVE SNAPPING ROLLS
8 Claims, 5 Drawing Figs.

[52] U.S. Cl. .................................................... 130/30, 56/327; 171/28
[51] Int. Cl. ....................................................... A01d 45/00

[50] Field of Search ............................................. 130/30; 56/327; 171/28

[56] References Cited
UNITED STATES PATENTS

| 2,901,048 | 8/1959 | Krukowski ................... | 130/30P |
| 2,903,839 | 9/1959 | Grew ........................... | 56/1M |
| 2,911,978 | 11/1959 | Morrison ...................... | 130/30P |
| 3,034,585 | 5/1962 | Rainville et al. ............. | 130/28 |
| 3,387,611 | 6/1968 | Looker ......................... | 130/30 |

*Primary Examiner*—Antonio F. Guida
*Attorneys*—F. W. Anderson and C. E. Tripp

ABSTRACT: The snapping rolls of a cucumber harvester are spring pressed together but hydraulic cylinders can retract one roll in response to an increase in the hydraulic pressure required to drive the rolls by a hydraulic motor, thereby preventing plugging of the rolls by roots, etc.

PATENTED JAN 5 1971

INVENTORS.
OLIN L. LOOKER
LARRY L. SLATES

BY F. W. Anderson
C. E. Tripp

ATTORNEYS

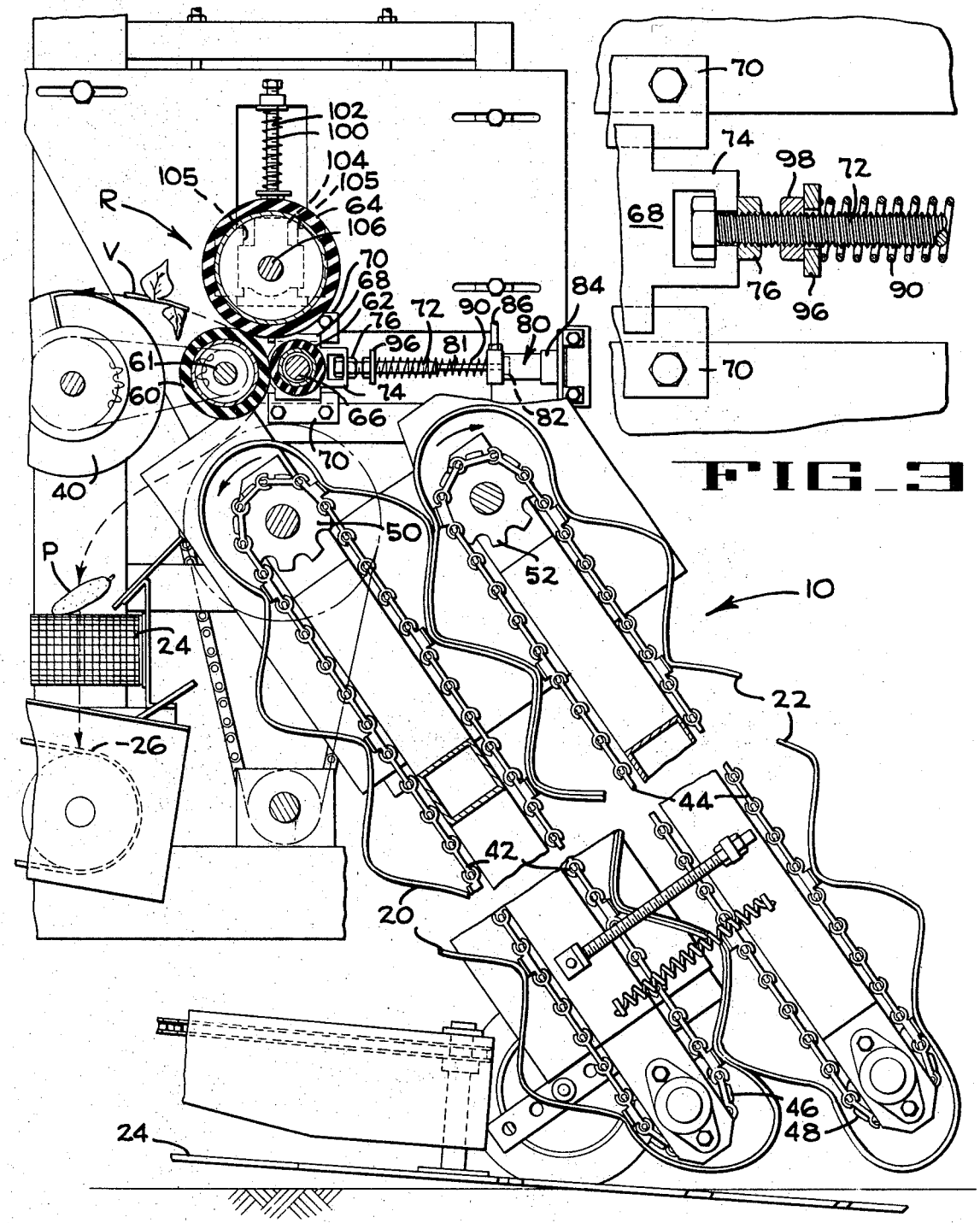

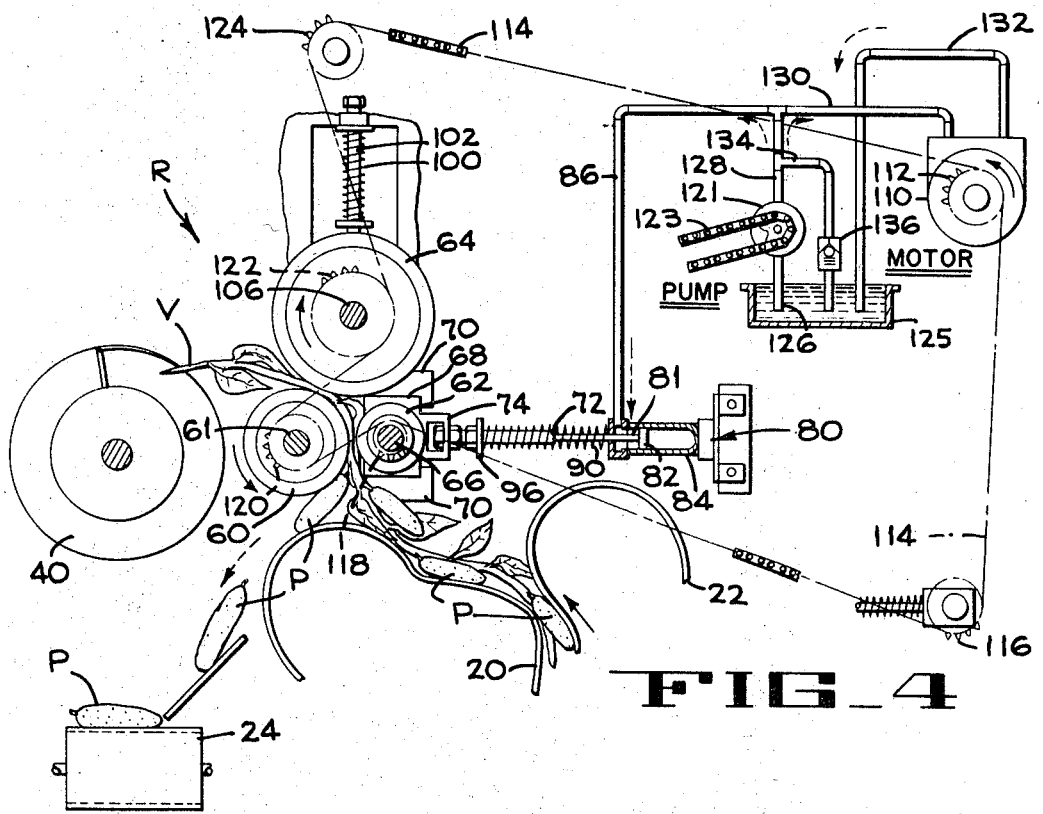
FIG_4
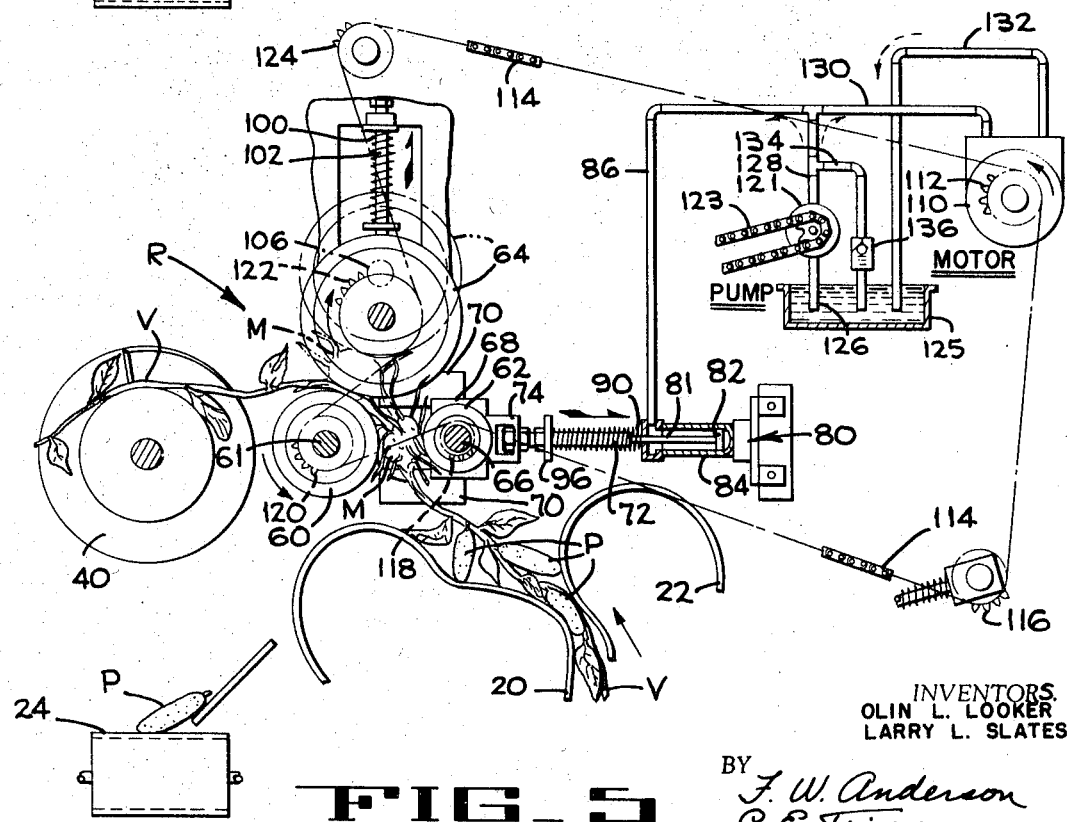
FIG_5

3,552,398

HARVESTER WITH TORQUE RESPONSIVE SNAPPING ROLLS

FIELD OF THE INVENTION

This invention relates to harvesting, but more particularly to a nonplugging snapping roll set for a vine crop harvester, such as a cucumber harvester or the like.

DESCRIPTION OF PRIOR ART

The use of direct acting hydraulic pressure cylinders for urging crushing mill rollers together is known in patents such as Newbold 1,107,757, June 30, 1914; Scharnberg 1,848,547, Mar. 8, 1932; Bosshard 3,010,663; Nov. 28, 1961; and Kautz, 3,122,992, Mar. 3, 1964. These devices merely yield directly and continuously in response to roll pressure and are not suitably sensitive for harvesting applications of the type to which the present invention relates.

The use of a load cell responsive to roll pressure to adjust the hydraulic pressure between rolling mill rolls, to maintain a constant roll pressure at various openings is known in Fox 3,159,063, Dec. 1, 1964.

SUMMARY OF THE INVENTION

The embodiment of the invention to be described in detail is a roll set for the snapping rolls of a vine crop harvester such as the cucumber harvester or the like. In the machine harvesting of cucumbers as carried out under the present invention, the growing vines are severed at the ground and elevated to snapping rolls. The snapping rolls form a nip throat which grasps the vines and pull them through the rolls, but the rolls are urged together with considerable force to prevent passage of cucumbers through the rolls. The cucumbers are snapped off the rolls at the nip throat and dropped down into a collector.

The attachment of green cucumbers to the growing vines is quite firm and requires a good grip on the vines to pull them free of the cucumbers. This, in turn, requires that the force pressing the rolls together (which is usually in the form of a pair of springs at opposite ends of one snapping roll), must be relatively high. Even so, a pull augmenting roll set downstream of the snapping rollers is required.

Under field conditions, clumps, roots, masses of weeds or the like may be carried up within the mass of vines and cucumbers and delivered to the nip throat of the snapping rolls. When bodies of these type enter between the rolls they are solid enough to require spreading of the rolls for passage without stopping the rolls and plugging them. These can be termed "recalcitrant" bodies. However, for reasons described, in cucumber harvesters these recalcitrant bodies do not readily spread the rolls because the rolls are spring urged together with sufficient force or pressure to exclude cucumbers, and particularly the pickles. However, if such bodies do enter and are gripped between the rolls, the driving torque necessary to continue rotation of the rolls and hence to prevent plugging thereof during harvesting, increases substantially. As will be seen, advantage is taken of this increase in torque requirement under the present invention.

To load the rolls so that they merely yield directly in response to the introduction of these recalcitrant foreign bodies therebetween, a technique characteristic of prior art, will not provide adequate snapping action. On the other hand, if the roll pressure is high enough to provide good snapping action, the interference with roll rotation caused by these recalcitrant bodies may slow or stop roll rotation and cause plugging of harvesters of the type to which this invention relates.

In accordance with the present invention, interference with roll rotation caused by recalcitrant foreign bodies is sensed, not as a roll engagement force or pressure increase, but rather as an increase in pressure in a hydraulic system that forms part of the drive for the rolls. Thus, when recalcitrant foreign bodies are drawn between the rolls thus resisting further rotation thereof, the roll torque requirements rise, and the pressure in the line between the constant displacement hydraulic pump and the hydraulic motor that drives the rolls rises steeply correspondingly in an effort to maintain roll rotation. Hydraulic roll retracting cylinders are connected to the ends of one of the snapping rolls at the preload springs associated therewith and these cylinders are connected in the hydraulic drive lines just described by way of branch lines. Thus, the hydraulic roll retracting cylinders sense the increase in hydraulic driving pressure developed in the roll drive system. The cylinders are designed so that when roll drive torque exceeds a certain predetermined value, the cylinders can overcome the force of the springs that press the rolls together, and open the rolls until driving torque is reduced again. Thus, as soon as the rolls open in response to this hydraulic torque sensing mechanism, the torque required to rotate the rolls is immediately reduced, the rolls keep running, and rapidly clear the offending objects from between the rolls. Once cleared, the rolls immediately return to their normal pressure engagement under the force of the springs, for snapping off cucumbers until the next interference of the type described occurs.

The downstream pull augmenting rollers assist in pulling vines through the snapping rollers when their passage is not obstructed, as well as assisting in keeping the vines moving when the snapping rolls open. Hence, the pull augmenting rolls cooperate with the torque responsive snapping rolls to preclude plugging of the harvester.

BRIEF DESCRIPTION OF THE DRAWINGS

FIG. 2 is an enlarged vertical section through the pickup and snapping roll set of the harvester.

FIG. 3 is an enlarged detail of the spring and piston hydraulic system on one end of a snapping roll.

FIGS. 4 and 5 are diagrams showing operation of the invention.

DETAILED DESCRIPTION OF THE INVENTION

Typical Harvester

Figure 1:
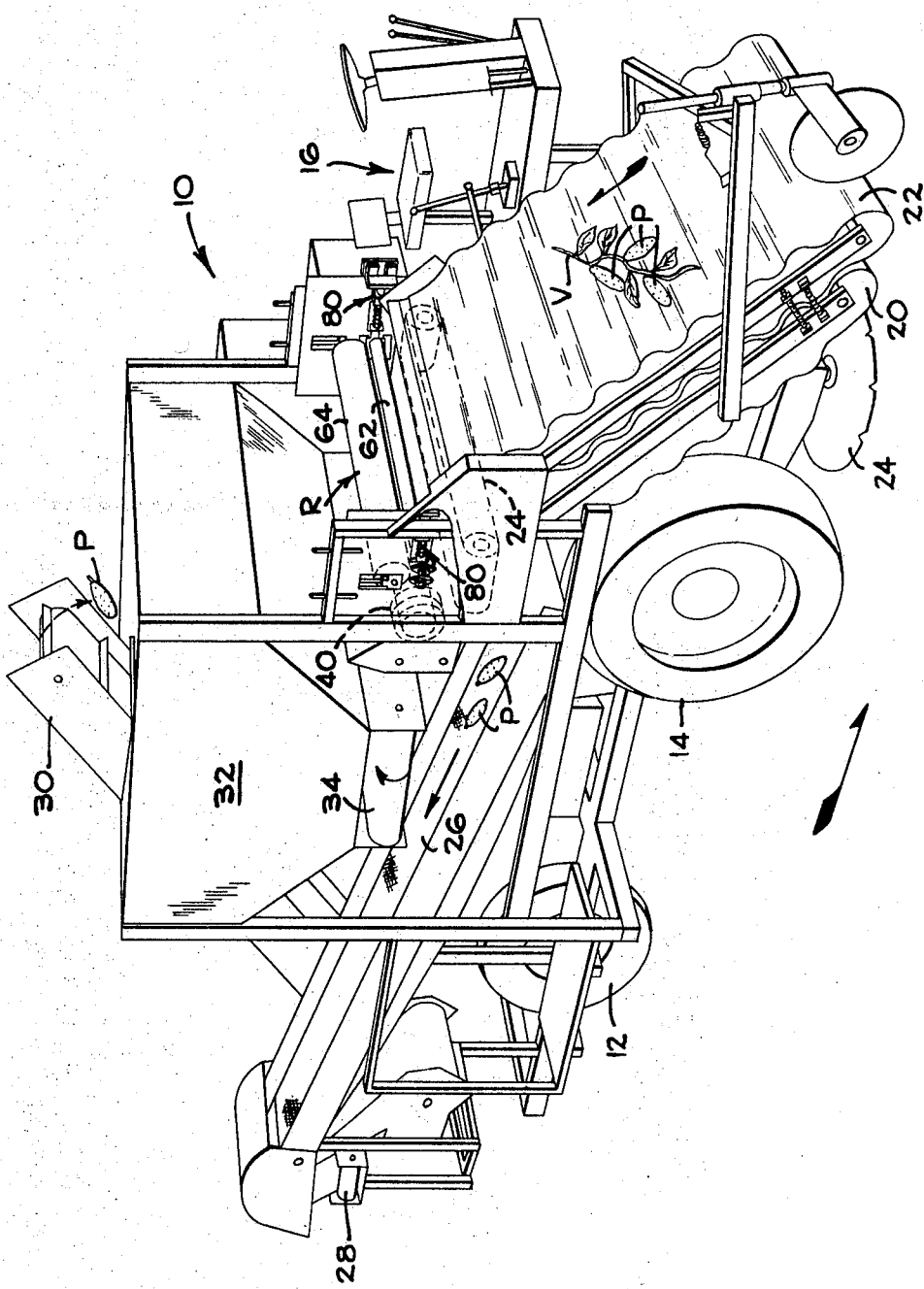
FIG. 1 is a perspective of a cucumber harvester embodying the present invention.

The harvesting snapping rolls of the present invention are illustrated as applied to a cucumber or pickle harvester. These machines are directed down rows of growing crops and sever the vines, elevate them and remove the green pickles and cucumbers from the vines. The attachment of the growing cucumbers to the vines is quite firm, more so than in most harvested crops. Hence the force with which the snapping rolls are urged together is high, in order that sufficient grip can be exerted on the vines to pull them clear of the cucumbers, while excluding cucumbers (especially the pickles) from passing between the rolls. This condition provides the problem previously mentioned and solved by the present invention.

Referring to FIG. 1, the cucumber harvester 10 therein illustrated includes the usual frame structure driven by rear wheels 12 (only one showing) and an internal combustion engine and power train, not shown and not critical to the invention as to details. The harvester is steered down the rows of the cucumbers by front steering wheels 14 and is controlled from a main operator station 16.

The vines and attached cucumbers (and pickles) P are initially gripped by upwardly running sinuous belts 20, 22 and the vines are severed at the ground by a pair of oppositely rotating discs 24. The manner in which the belts 20, 22 and discs 24 are driven is not critical to the present invention and a suitable drive is shown in the patent to Looker 3,387,611, June 11, 1968, assigned to the FMC Corporation.

The sinuous belts 20, 22 deliver the vines and attached cucumbers to the nip throat of a roll set R, which is constructed and driven in accordance with the present invention. The rolls set includes snapping rolls which pull the vines clear of the cucumbers or pickles P, the latter dropping from the rolls on to a laterally running collector belt 24. The collector belt 24 deposits the crop on an elevator conveyor 26 which drops it onto a short lateral conveyor 28. The latter delivers the pickles or cucumbers P to a final elevator 30 for delivery to a hopper 32. The hopper 32 can be cleared by a side delivery conveyor 34. These conveyors and elevator details are not critical to the invention.

The vines V, which are pulled clear of the cucumbers by the snapping roll set R, enter a laterally extending screw conveyor 40 which carries the vines clear of the machine and drops them out to one side thereof.

Additional details of the machine relating to the present invention appear in FIGS. 2 and 3. The sinuous belts 20, 22 are supported on chains 42, 44 respectively, which are trained over idler sprockets 46, 48 and driving sprockets 50, 52. The chains and sprockets are driven in a manner as shown in the aforesaid Looker Pat. 3,387,611, this drive not being critical to the present invention.

Roll Set

The roll set R includes a fixed snapping roll 60 and a spring loaded snapping roll 62 which is pressed against the fixed snapping roll. A vine pull augmenting roll 64 engages the fixed snapping roll 60. The rolls 62 and 64 are preferably covered with rubber to augment their gripping action, which rubber may have the hardness characteristic described and claimed in the patent to Tillotson 3,387,612, June 11, 1968, assigned to the FMC Corporation.

The preferred geometrical arrangement of the rolls, including a gap between the snapping roll 62 and the vine gripping roll 64 is described in detail and claimed in the aforesaid Looker Patent 3,387,611.

The feature of augmenting the pull on the vines is claimed in De Long 3,347,031, but the embodiment therein shown employs belts instead of snapping rolls, and hence is not readily adaptable to utilization of the present invention.

The spring loaded snapping roll 62 is mounted on a shaft 66 and the ends of the shaft are mounted on sliding blocks 68. These blocks are guided by ways 70 secured to the frame of the machine. A combined piston rod and spring locating bolt 72 (FIG. 3) is secured to a bracket 74 projecting from each block 68, by a nut 76 on the bolt. The other end of the bolt 72 connects to a hydraulic cylinder assembly 80 and in this embodiment the bolt 72 connects to a piston rod 81 of the piston 82 of the cylinder. The cylinder body 84 of the cylinder assembly 80 is mounted on the frame. A drive pressure sensing line 86 connects to the cylinder assembly 80 in a manner whereby pressure in the line 86 tends to retract the snapping roll 62 from the opposed roll 60.

Each end of the snapping roll 62 is preloaded against the snapping roll 60 by a coil spring 90, which surrounds the bolt 72 and the piston rod 81. One end of the spring 90 is backed up by the head of the cylinder 84 (FIG. 2) whereas the other end of the spring is backed up by a washer 96 and a nut 98 threaded on the bolt 72. The preload on the springs 90 can be adjusted by means of the nuts 98 to provide the desired nominal force or preload between the snapping rolls 60, 62.

In the embodiment illustrated, each end of the pull augmenting roll 64 is resiliently pressed against the snapping roll 60 by a spring 100 that surrounds a bolt 102 secured to a sliding block 104. The block 104 slides in ways 105 on the machine frame. A spring and sliding block assembly just described is mounted on each side of the machine and supports the ends of the shaft 106 for the pull augmenting roll 64. Since the engagement between the roll 64 and the roll 60 is merely to augment the pull on the vines and not to exclude pickles or cucumbers, the spring rate of the spring 100 is normally not as high nor as critical as that of the spring 90 for the snapping rolls. Hence no hydraulic torque relief mechanism is required for this spring assembly.

Roll Drive

The drive train for the roll set R is shown in FIGS. 4 and 5. All three rolls are driven by a hydraulic motor 110 having a sprocket 112 which drives a chain 114. The chain is trained over a spring loaded idler sprocket 116, a drive sprocket 118 on the shaft 66 of the snapping roll 62, a drive sprocket 120 on the shaft 61 of the snapping roll 60, a drive sprocket 122 on the shaft 106 of the pull roller 64 and an upper idler sprocket 124. Rotation of the hydraulic motor 110 drives the snapping rolls 60, 62 in opposite directions and in a manner which forms a nip throat that faces the lower sinuous belt 20, and pulls vines and attached cucumbers upwardly from the zone to which they are delivered by both sinuous belts 20, 22.

The snapping roll 60 and the pull roll 64 are also driven oppositely and in a direction that augments the pull on the vines for assisting in snapping of the cucumbers from the vines at the rolls 60, 62 as well as for delivering the stripped vines V to the screw conveyor 40, previously mentioned. The various drive sprockets are dimensioned relative to their respective rolls so that all rolls are driven at substantially the same peripheral speed.

Hydraulic Circuit

The hydraulic system for the motor 110 forms a part of the roll set assembly R of the present invention. The engine (not shown) for the harvester drives a pump 121 by means of a chain 123 and a transmission and gearing of conventional design, not critical to the invention. Modern harvesters have numerous accessories, conveyors and the like which are conventionally driven by hydraulic motors from one or more mechanically operated pumps in a manner well known in the art. Since these engineering features are not critical to the present invention they are not shown in detail.

The constant displacement pump 121 draws oil from a sump 125 by an inlet line 126 and delivers oil to the motor by lines 128, 130. Oil is returned to the sump from the motor by a line 132. In the driving circuit, and in this case connected to the line 128, is a pressure relief line 134 which connects to an adjustable pressure relief valve 136 of conventional design that can return oil to the sump 125. The valve 136 is adjusted to bypass oil from the pump 121 directly to the sump at a certain maximum safe driving pressure in the hydraulic lines, which pressure could be reached in case the snapping rolls were jammed by roots or other foreign masses of the type previously mentioned. If a jam of this type were to occur, the relief valve 136 would open for discharge to the sump, the snapping rolls would no longer be rotated and hence they would become plugged. However, under the present invention, action by the relief value is seldom called for.

In accordance with the present invention, each hydraulic cylinder assembly 80 is connected to the driving assembly just described at the junction of pump lines 128, 130 by the drive pressure sensing line 86. This line connects to each cylinder 84 so that pressure in the cylinder assembly urges retraction of the snapping roll 62. Retraction can only take place however, if cylinder pressures are sufficient to overcome the combined force of the two preload springs 90.

Design Example

By way of design example, in the harvester being described the diameter of the piston 82 will be 1.125 inches with an effective area of about one square inch. The spring rate of each spring 90 will be 808 pounds per inch deflection. Each spring will be preloaded five-eights inch to exert a force on the snapping rolls of about 1,000 pounds. By mounting snapping roll 62 above snapping roll 60, the weight of snapping roll 60, 150 pounds, would be added to the spring preload of 1,000 pounds. This would give a total force on the snapping rolls of 1,150 pounds.

The normal maximum operating pressure of the hydraulic drive system will be somewhat less than 500 p.s.i.g., so that at this pressure the preload by the springs 90 is almost removed, but even at this pressure the passage of vines through the rollers 60, 62 exerts additional load on the springs and maintains a drive. At the more usual, somewhat lower operating drive pressures in the hydraulic lines, a substantial preload from the springs 90 remains, even when no vines are passing between the snapping rollers.

The spring rate of each spring 100 for the pull roll augmenting roller 64 will, in this example, be 125 pounds per inch of deflection and each spring will be preloaded to about 30 pounds force on the roller 64. Actually, the weight of the roll itself, which is well over 100 pounds, may suffice as a roll loading.

The relief valve 136 will be set to discharge to the sump at 1800 p.s.i., but this pressure in the lines is reached only under extraordinary conditions.

Operation

FIG. 4 illustrates the usual harvesting condition wherein the driving torque required by the snapping rolls 60, 62 is not high enough to cause hydraulic retraction of the roll 62. Thus, the springs 90 can press the roll 62 against the roll 60 with a substantial preload force. Vines V and attached pickles or cucumbers P are fed upward from the sinuous rolls 20, 22 into the nip throat of rolls 60, 62 as previously described. The vine stalks and their leaves are gripped by the snapping rolls and pulled through. The snapping rolls may be separated slightly by the combined action of the vines along the length of the rolls, thereby increasing the loading by the springs 90.

After passing through the snapping rolls, the stripped vines are gripped between the rear snapping roll 60 and the pull roll 64, to augment the pull on the vines and assist in snapping off cucumbers at the snapping rolls 60, 62.

When the rolls 60, 62 are rubber covered, and in normal operation, the thickness of a single stalk of vines V is not sufficient to substantially separate the rolls but the rubber is locally deformed and the vines are flattened somewhat by spring pressure between the rolls. Thus, any gap that opens between the snapping rolls is too small to pass cucumber or pickles P. The crop snapped off at the snapping rolls is deposited on the conveyor 24, as previously described. Driving pressure in the hydraulic lines will usually not exceed 500 p.s.i.g., and in fact will be less, so that some preload by the springs 90 remains.

In FIG. 5, a weed root or recalcitrant mass M has been drawn up between the snapping rolls 60, 62. In order to pass this mass, the snapping rollers must separate farther than normal and the springs 90 must be deflected substantially more than before. The driving torque required to wedge open the snapping rolls against the force of springs 90 will now exceed the normal driving torque, and hence the pressure delivered by the constant speed, constant displacement pump 121 rises rapidly.

If the mass M is of substantial size, this increase in torque required to drive the snapping rolls, is translated into a corresponding increase in hydraulic pressure in the hydraulic lines, including the sensing line 86. The increased pressure on the pistons 82 of the cylinders 80 will now overcome the remaining preload on the coil springs 90 and retract the roll 62 from the roll 60.

As soon as the preload and the aforesaid additional load on the springs 90 is overcome by the cylinders 80, the roll 62 is retracted by the cylinders and passage of the mass M through the rollers is facilitated. The driving torque is immediately reduced but only enough to maintain driving contact with mass, insuring continued passage of material through the rolls. Since the rolls are neither stopped nor substantially slowed down, the mass cannot plug rolls. The retraction accomplished by the system of the present invention will usually be just sufficient to accommodate driving recalcitrant masses of material through the snapping rolls but not enough to let the rolls slip on the mass. Thus, even when the snapping roll 62 is partially retracted by the cylinders 80 this retraction is only enough to accommodate passage of the mass and does not remove the driving action of the snapping rolls. Furthermore, the rolls 64, 60 continue to exert pull on the vines so that the net effectiveness of the roll set R remains almost constant.

Of course, if an unusually large or difficult object such as a large rock or the like jams in the rolls so that no normal operating retraction by the hydraulic system is ineffective to keep the rolls turning, the relief 136 will open and protect the lines and the rolls will stop. However, this condition seldom occurs in the field.

The spring rate of the springs 100 for the pull roll 64 is less than that for the snapping roll springs 90. Hence, the mass M will usually clear the pull rolls 64, 60 without increasing the hydraulic pressure in the motor lines sufficiently to retract the snapping roll 62 against the preload on the springs 90.

Thus, it can be seen that continuous, nonplugging operation of a cucumber harvester or the like can be maintained by biasing the snapping rolls through a torque sensitive device that overcomes the preload on the main snapping roller when recalcitrant objects other than the vines themselves obstruct the rolls and their rotation.

Although the best mode contemplated for carrying out the present invention has been herein shown and described, it will be apparent that modification and variation may be made without departing from what is regarded to be the subject matter of the invention as set forth in the appended claims.

We claim:

1. A nonplugging harvester for vine crops or the like comprising a pair of snapping rolls, spring means for pressing said rolls together for gripping the vines but excluding the crop, actuator means for reducing the force with which said spring means presses said rolls together, drive means for said rolls, and means connected to said actuator means and to said roll drive means and responsive to the torque required to drive said rolls for causing said actuator means to reduce the force with which said spring means presses said rolls together as the torque required to drive said rolls increases.

2. The harvester of claim 1, including means downstream of said snapping rolls for augmenting the pull on the vines; and means for feeding the vine crop to said rolls.

3. A nonplugging snapper roll set for vine crop harvesters or the like comprising a pair of snapping rolls, preloaded spring means for pressing one of said rolls against the other for gripping the vines but excluding the crop, hydraulic cylinder means for retracting said one roll against the force of said spring means, hydraulic pump and motor means for driving said rolls, and a hydraulic connection from said hydraulic roll driving means to said hydraulic cylinder means for retracting said one roll in response to a predetermined pressure increase in said hydraulic connection caused by an increase in the torque required to drive said rolls; and means for feeding the vine crop to said snapping rolls.

4. The roll set of claim 3, wherein the pressure attained in said hydraulic connection is insufficient to overcome the spring preload when vines are freely passing through said snapping rolls.

5. The roll set of claim 4, wherein pull roll means are provided behind said snapping rolls for augmenting the pull on the vines.

6. The roll set of claim 5, wherein said pull roll exerts less force than the spring load on said snapping rolls.

7. The roll set of claim 4, wherein said torque responsive snapping roll is mounted one on top of the other so that the weight of the top roller adds to the spring preload.

8. The roll set of claim 5 wherein the sets of rolls are mounted one above the other so that the weight of the top roller adds to the spring preload.